United States Patent
Mello, II (10) Patent No.: US 10,422,708 B2
(45) Date of Patent: Sep. 24, 2019

(54) INCH POUNDS PER TURN (IPPT) COMPUTING DEVICE FOR GARAGE DOORS

(71) Applicant: Thomas A. Mello, II, Scottsdale, AZ (US)

(72) Inventor: Thomas A. Mello, II, Scottsdale, AZ (US)

( * ) Notice: Subject to any disclaimer, the term of this patent is extended or adjusted under 35 U.S.C. 154(b) by 587 days.

(21) Appl. No.: 15/088,926

(22) Filed: Apr. 1, 2016

(65) Prior Publication Data

US 2016/0305830 A1 Oct. 20, 2016

Related U.S. Application Data

(60) Provisional application No. 62/148,329, filed on Apr. 16, 2015.

(51) Int. Cl.
| | |
|---|---|
| G01L 3/00 | (2006.01) |
| G01L 5/00 | (2006.01) |
| G01L 1/22 | (2006.01) |
| G01L 5/04 | (2006.01) |
| E05D 13/00 | (2006.01) |

(52) U.S. Cl.
CPC .............. *G01L 1/22* (2013.01); *G01L 5/0061* (2013.01); *G01L 5/04* (2013.01); *E05D 13/1261* (2013.01)

(58) Field of Classification Search
CPC ............ G01L 1/22; G01L 5/0061; G01L 5/04
See application file for complete search history.

(56) References Cited

U.S. PATENT DOCUMENTS

| 6,161,438 | A * | 12/2000 | Mullet | E05F 15/41 |
| | | | | 73/774 |
| 8,590,209 | B1 * | 11/2013 | Skotty | E05D 13/12 |
| | | | | 49/197 |
| 2003/0000655 | A1* | 1/2003 | Martin | E05D 13/1261 |
| | | | | 160/191 |
| 2006/0231217 | A1* | 10/2006 | Martin | E05D 13/003 |
| | | | | 160/201 |
| 2007/0227316 | A1* | 10/2007 | Lucke | B25B 23/1425 |
| | | | | 81/478 |
| 2011/0290431 | A1* | 12/2011 | Ehrlich | E05D 13/1261 |
| | | | | 160/190 |
| 2012/0168098 | A1* | 7/2012 | James | E05D 13/1261 |
| | | | | 160/189 |

(Continued)

*Primary Examiner* — Toan K Le
(74) *Attorney, Agent, or Firm* — Schmeiser, Olsen & Watts LLP (57) ABSTRACT

Disclosed is an inch pounds per turn (IPPT) computing device that provides for the calculation of IPPT of a garage door spring coil. The IPPT computing device computes the IPPT required of the garage door spring coil by measuring the strain induced on a calibrated shaft used to lift the weight of the garage door. The IPPT computing device is inserted into the winding end cone of a garage door torsion spring assembly, and the door is slightly lifted off of the floor. This measurement is done by disabling the cable ends spring end so the counterbalance force is removed from the door. The IPPT tool measures the torque (strain on the calibrated rod) needed to lift the door and inputs the torque value automatically into an IPPT calculator mounted on the tool. When other door parameters are entered into the calculator, the IPPT is calculated.

14 Claims, 6 Drawing Sheets

(56) References Cited

U.S. PATENT DOCUMENTS

| | | | | |
|---|---|---|---|---|
| 2012/0234569 A1* | 9/2012 | Lawton | ................... | B25B 21/00 |
| | | | | 173/181 |
| 2014/0027072 A1* | 1/2014 | Schutt | .................... | E05D 15/24 |
| | | | | 160/191 |
| 2017/0191887 A1* | 7/2017 | Yang | ....................... | G01L 5/108 |

* cited by examiner

INCH POUNDS PER TURN (IPPT) COMPUTING DEVICE FOR GARAGE DOORS

CROSS REFERENCE TO RELATED APPLICATIONS

This application claims priority to U.S. Provisional Application entitled "IPPT Torsion Measuring Tool for Garage Doors" to Thomas A. Mello, filed Apr. 16, 2015, Ser. No. 62/148,329.

BACKGROUND OF THE INVENTION

Field of the Invention

This invention is directed toward useful tools in the garage door repair and installation industry. In particular, the embodied tool is used to take a measurement that is helpful in the design, installation, and repair of garage door counterbalance springs.

Description of Related Art

Sectional garage doors are known in the art. Although the design of sectional garage doors can vary, certain components are common to garage door systems. A typical sectional garage door has a number of panel sections—usually four—that are hinged together at their upper and lower horizontal edges. A number of hinges with horizontal pins are incorporated into the door sections to allow the door to be lifted vertically and then rotate 90 degrees through a track system. The door sections include a number of rollers that ride in a track on either side of the garage door.

Some garage doors are large and heavy by being made from a thick wood, and some are very light by using aluminum or light gauge steel panels. Since a garage door is relatively large, it is normal to provide a spring counter balance system so as to make opening relatively easy no matter the weight. The springs are usually one of two styles: extension or torsion.

Extension springs are often used with a simple cable system to facilitate economy and a relatively smooth force over the entire lift. As the door is lifted, the amount of force needed to lift the door reduces, and the extension spring is well adapted to this situation.

Similarly, torsion springs also counterbalance the door. They are typically a wound wire surrounding a torsion bar that is connected to the garage door by a drum/cable. The springs have a designed cycle life, based on the number of operations. Periodically, the springs break and need to be replaced.

The torsion counterbalancing springs are designed using an inch pounds per turn (IPPT) criterion using parameters such as the weight of the door, the number of cycles, the size of the drum that is used on the torsion bar, and other factors.

The torsion spring is connected to a torsion bar, which in turn is connected to a cable drum on either side of the door. A lifting cable from the drum is connected to the lower edge of the door. When the door is lowered, the withdrawal of the cable from the drum causes the shaft to turn, which winds up the torsion spring. Typically, one or two torsion springs are chosen so that the counterbalancing force provides an acceptable and smooth lifting force, and an acceptable life.

As stated previously, spring failure is a common occurrence, and the selection of a replacement spring is fraught with difficulties. A spring is properly designed using a number of variables to provide acceptable life and a smooth operation. Repairmen who face broken springs often will select a spring that is a direct replacement for the failed spring. However, if the door failure is related to an improperly designed spring(s), the problem will re-occur. The repairman often assumes the original design was correct. It is much preferred to check the spring design when repairing a broken door.

Proper spring design is inconvenient for a repair man, and the repair man must currently take a number of steps to determine the required spring. The length of time to make a new selection and the ability to get all the information needed for the design hinders the effort. In particular, the door weight is awkward to obtain and the use of a bathroom scale is often the method used.

What is needed is a method to provide the repairman the calculation tool needed, and a simplified procedure to obtain the door weight.

BRIEF SUMMARY OF THE INVENTION

The embodied invention is a tool that provides for the calculation of inch pounds per turn (IPPT) by measuring the door weight with a specialized IPPT tool. The IPPT tool is inserted into the winding end of a torsion spring coil and the door is slightly lifted off of the floor. This measurement is done by disabling the cable ends spring end so the counterbalance force is removed from the door. The IPPT tool measures the torque needed to lift the door (strain on an IPPT computing device shaft) and inputs the torque value automatically into an IPPT calculator mounted on the tool. When other door parameters are entered into the calculator, the IPPT is calculated. The length of the spring and its dimensions are then readily determined, simplifying spring selection.

Disclosed is an inch pound per turn (IPPT) computing device for a garage door spring coil. The IPPT computing device includes a shaft, a strain gauge coupled to the shaft, and a calculator unit mechanically coupled to the shaft and communicatively coupled to the strain gauge. The calculator unit computes an inch pounds per turn (IPPT) value required for the garage door spring coil in response to receiving a strain measurement from the strain gauge. In some embodiments, the shaft comprises an insert end and a handle end opposing the insert end. In some embodiments, the insert end couples to a winding end cone coupled to the garage door spring coil. In some embodiments, the strain gauge outputs the strain measurement in response to measuring a strain on the shaft. In some embodiments, the calculator unit comprises a processor and an input device coupled to the processor. In some embodiments, the processor computes the inch pounds per turn required for the garage door spring coil using the strain measurement and a drum size. In some embodiments, the processor computes the inch pounds per turn required for the garage door spring coil in response to receiving the strain measurement from the strain gauge and a garage door height.

Disclosed is a method of determining the inch pounds per turn (IPPT) for a garage door torsion spring assembly of a garage door opening system. The method includes inserting an inch pounds per turn (IPPT) computing device into a winding end cone of the garage door torsion spring assembly. The method also includes raising a garage door coupled to the winding end cone using the IPPT computing device. The method also includes reading the IPPT from a display of the IPPT computing device.

In some embodiments, the method includes disconnecting a garage door from the garage door opening system. In some embodiments, the method includes unwinding a spring coil of the garage door torsion spring assembly. In some embodiments, the method includes coupling the winding end cone of the garage door torsion spring assembly to a torsion bar of the garage door opening system. In some embodiments, the method includes restraining movement of the torsion bar of the garage door opening system before unwinding the spring coil of the garage door torsion spring assembly. In some embodiments, the method includes inputting a drum size into an input device of the IPPT computing device before inserting the inch pounds per turn (IPPT) computing device into the winding end cone of the garage door torsion spring assembly. In some embodiments, the method includes inputting a garage door height into an input device of the IPPT computing device before inserting the inch pounds per turn (IPPT) computing device into the winding end cone of the garage door torsion spring assembly. In some embodiments, the method includes entering a strain gauge measurement output from a strain gauge of the IPPT computing device into an input device of the IPPT computing device before reading the IPPT from the display of the IPPT computing device. In some embodiments, raising the garage door coupled to the winding end cone using the IPPT computing device comprises using the IPPT computing device as a lever to raise the garage door using the torsion bar and drums. In some embodiments, raising a garage door coupled to the winding end cone using the IPPT computing device includes raising the garage door at least one inch.

Disclosed is a system for computing the inch pounds per turn (IPPT) required of a garage door spring coil. The system includes a garage door torsion spring assembly and an IPPT computing device. The garage door torsion spring assembly is coupled to a garage door. The garage door torsion spring assembly includes a winding end cone coupled to a winding end of the garage door spring coil. The inch pound per turn (IPPT) computing device includes an insert end, where the insert end removably couples to the winding end cone of the garage door spring assembly, and a processor, where the processor computes the IPPT required of the garage door spring coil. In some embodiments, the winding end cone of the garage door torsion spring assembly is coupled to the garage door through a torsion shaft. In some embodiments, the IPPT computing device further comprises a strain gauge. In some embodiments, the processor computes the IPPT required of the garage door spring coil in response to receiving a strain measurement from the strain gauge. In some embodiments, the strain gauge sends the strain measurement to the processor in response to the IPPT computing device being used to raise the garage door using the winding end cone.

DETAILED DESCRIPTION OF THE INVENTION

Figure 1A:
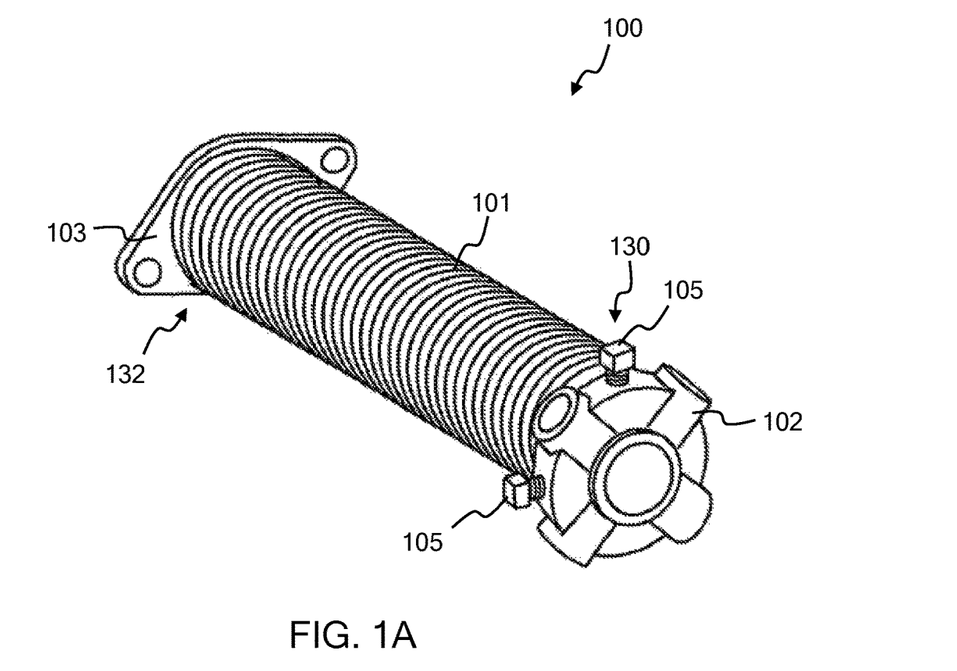
FIG. 1A is a perspective view of a garage door torsion spring assembly.
Figure 1B:
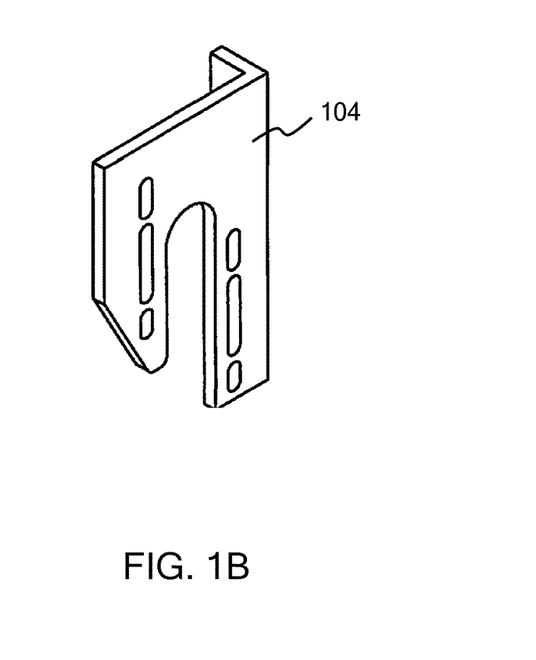
FIG. 1B is a perspective view of an anchor bracket.

FIG. 1A shows a garage door torsion spring assembly 100. Garage door torsion spring assembly 100 includes garage door spring coil 101. Garage door spring coil 101 has an anchor end 132 and a winding end 130. Anchor end 132 is coupled to a spring anchor end cone 103. Winding end 130 is coupled to a winding end cone 102. Spring anchor end cone 103 is bolted to an anchor bracket 104 as shown in FIG. 1B. Anchor bracket 104 anchors garage door torsion spring assembly 100 to a wall. A torsion shaft (not shown in FIG. 1A, see FIG. 2 shaft 204 and FIG. 3 shaft 344) is typically allowed to pass through anchor bracket 104. Garage door spring coil 101 is a torsion type which provides a torsion force when the door is lifted. Winding end 130 is preset to a torque amount during installation by turning winding end cone 102 of garage door spring coil 101 and then affixing winding end cone 102 to the torsion shaft by tightening bolts 105.

Figure 2:
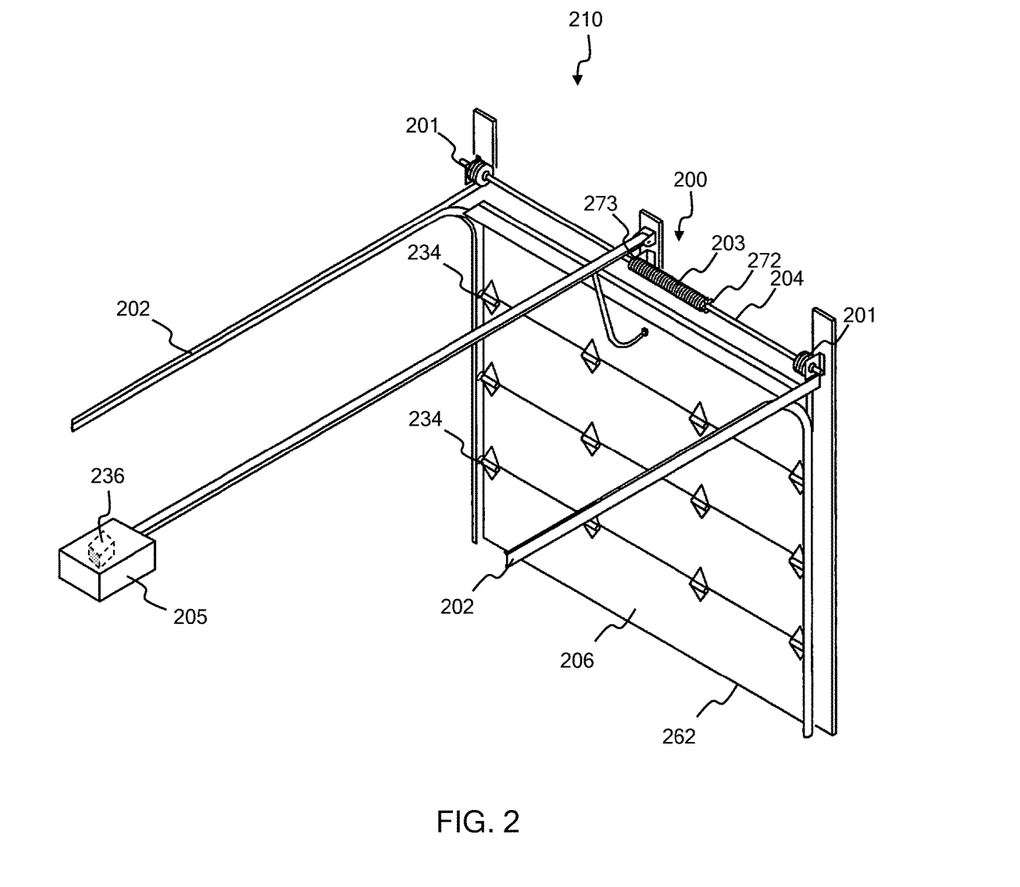
FIG. 2 is a perspective view of a garage door opening system.

FIG. 2 is a simplified illustration of a typical garage door opening system 210. Garage door opening system 210 opens a garage door 206. Garage door 206 is in the downward position in FIG. 2. A garage door opener controller 205 is used to receive signals from the home owner and operate a motor 236 so as to open (or close) garage door 206. A rail assembly 202 on either side of garage door 206 is used to guide rollers 234 (not all enumerated in FIG. 2) on the sides of garage door 206 to ensure garage door 206 opens evenly and easily. Drums 201 on each end of a torsion shaft 204 are used in connection with a lifting cable (not shown in FIG. 2, see cable 340 in FIG. 3). The lifting cables are attached to a bottom edge 262 of garage door 206. Garage door torsion spring assembly 200 is similar to garage door torsion spring assembly 100 shown in FIG. 1. Garage door torsion spring assembly 200 includes a garage door spring coil 203 with a winding end cone 272. Winding end cone 272 couples garage door spring coil 203 to torsion shaft 204. Garage door spring coil 203 is connected to torsion shaft 204 at winding end cone 272 and anchored at anchor end cone 273 so that garage door spring coil 203 can create a torsion force. Torsion shaft 204 is allowed to freely rotate inside garage door spring coil 203, even though torsion shaft 204 is connected to one end of garage door spring coil 203.

Garage door spring coil 203 of garage door torsion spring assembly 200 on garage door 206 is meant to counterbalance the door weight so that garage door opener 210 will only need a minimal amount of effort in lifting the door. Winding end cone 272 of garage door torsion spring assembly 200 is coupled to garage door 206 through torsion shaft 204.

Figure 3:
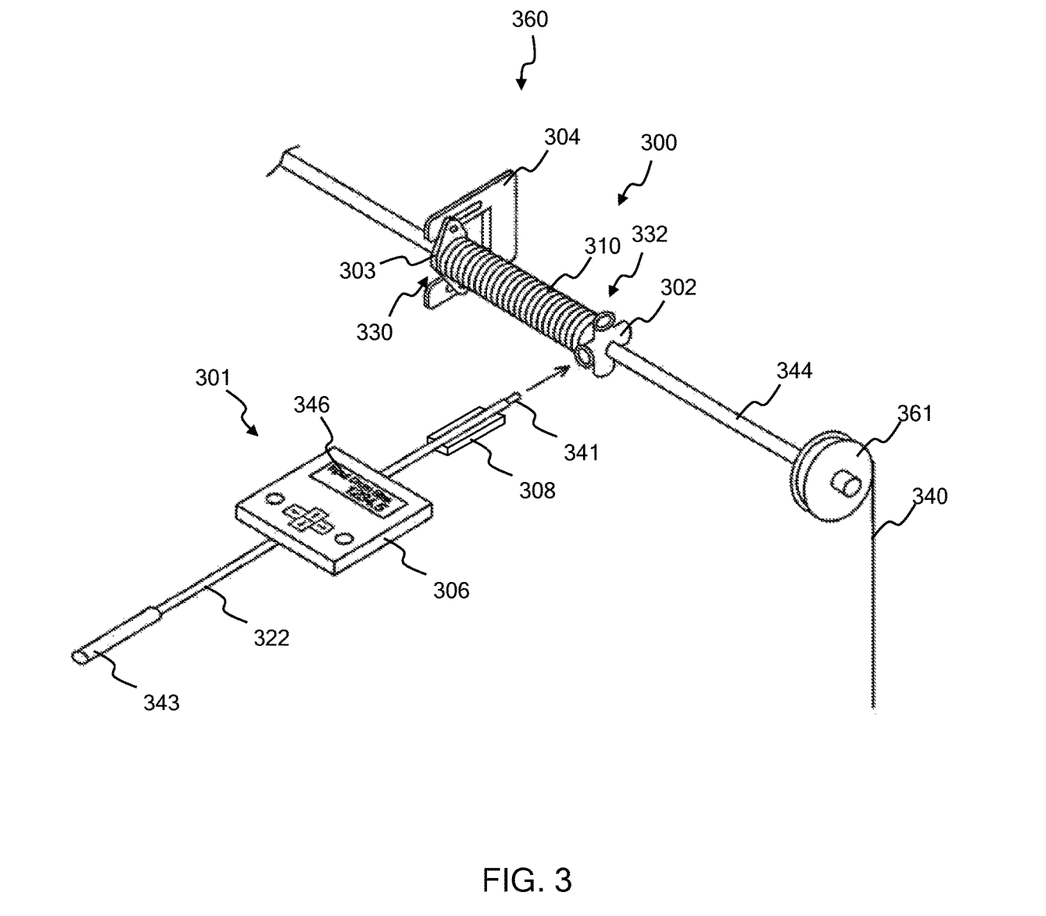
FIG. 3 is a perspective view of a system for computing the inch pounds per turn required of a garage door spring coil.

FIG. 3 shows a perspective view of a system 360 for computing the inch pounds per turn (IPPT) required of a garage door spring coil 310. Garage door spring coil 310 of FIG. 3 is part of a garage door torsion spring assembly 300. Garage door torsion spring assembly 300 is the same or similar to garage door torsion spring assembly 200 shown in FIG. 2 and garage door torsion spring assembly 100 shown in FIG. 1A. Garage door torsion spring assembly 300 is part of a garage door opening system such as garage door opening system 210 shown in FIG. 2, but the garage door and it associated components are not shown in FIG. 3 for simplicity. Garage door torsion spring assembly 300 includes garage door spring coil 310 with an anchor end 330 coupled to an anchor end cone 303, and a winding end 332 coupled to a winding end cone 302. Anchor end cone 303 is coupled to anchor 304. Anchor 304 couples garage door torsion spring assembly 300 to a wall. Winding end cone 302 couples to a torsion shaft 344. As torsion shaft 344 turns, roller 361 (the same or similar to rollers 201 in FIG. 2) rotate, and pull lifting cable 340 up and down, which opens and closes the garage door as described with respect to FIG. 2. Thus, winding end cone 302 is coupled to a garage door through torsion shaft 344.

System 360 also includes an inch pound per turn (IPPT) computing device 301. IPPT computing device 301 is used to compute the IPPT required of garage door spring coil 310, in this embodiment. IPPT computing device 301 is shown in FIG. 3 being used to compute the IPPT required of garage door spring coil 310, but it is to be understood that IPPT computing device 301 can be used to compute the IPPT of garage door spring coil 203 of FIG. 2, or garage door spring coil 101 of FIG. 1A.

IPPT computing device 301 includes a shaft 322, a strain gauge 308 coupled to shaft 322, and a calculator unit 306 coupled to shaft 322 and communicatively coupled to strain gauge 308. Strain gauge 308 measures the strain on shaft 322. Strain gauge 308 sends a strain measurement to calculator unit 306, where the strain measurement is a measurement of the strain on shaft 322. Calculator unit 306 computes the IPPT required for garage door spring coil 310 in response to receiving a strain measurement from strain gauge 308. Shaft 322 of IPPT computing device 301 includes an insert end 341 and a handle end 343 opposing insert end 341. In order to obtain an IPPT value required of garage door spring coil 310 as shown in FIG. 3, insert end 341 is inserted into winding end cone 302 of torsion spring assembly 300 and then slightly lifted upwardly (or downwardly depending on spring orientation) in order to send a measure of the strain on shaft 322 needed to lift the door weight to calculator unit 306. The anchor end cone 303 of spring coil 310 is bolted to bracket 304, which in turn is anchored to a garage wall. Insert end 341 is configured to couple to winding end cone 302 such that IPPT computing device 301 can be used as a lever to raise the garage door using winding end cone 302, torsion bar 344, and lifting cable 340. Strain gauge 308 outputs a strain measurement to calculator unit 306 in response to the strain on shaft 322 caused by using IPPT computing device 301 to lift the garage door. Calculator unit 306 calculates the IPPT required of garage door spring coil 310 in response to receiving the strain measurement from strain gauge 308, and displays the IPPT required of garage door spring coil 310 on display 346.

Figure 4:
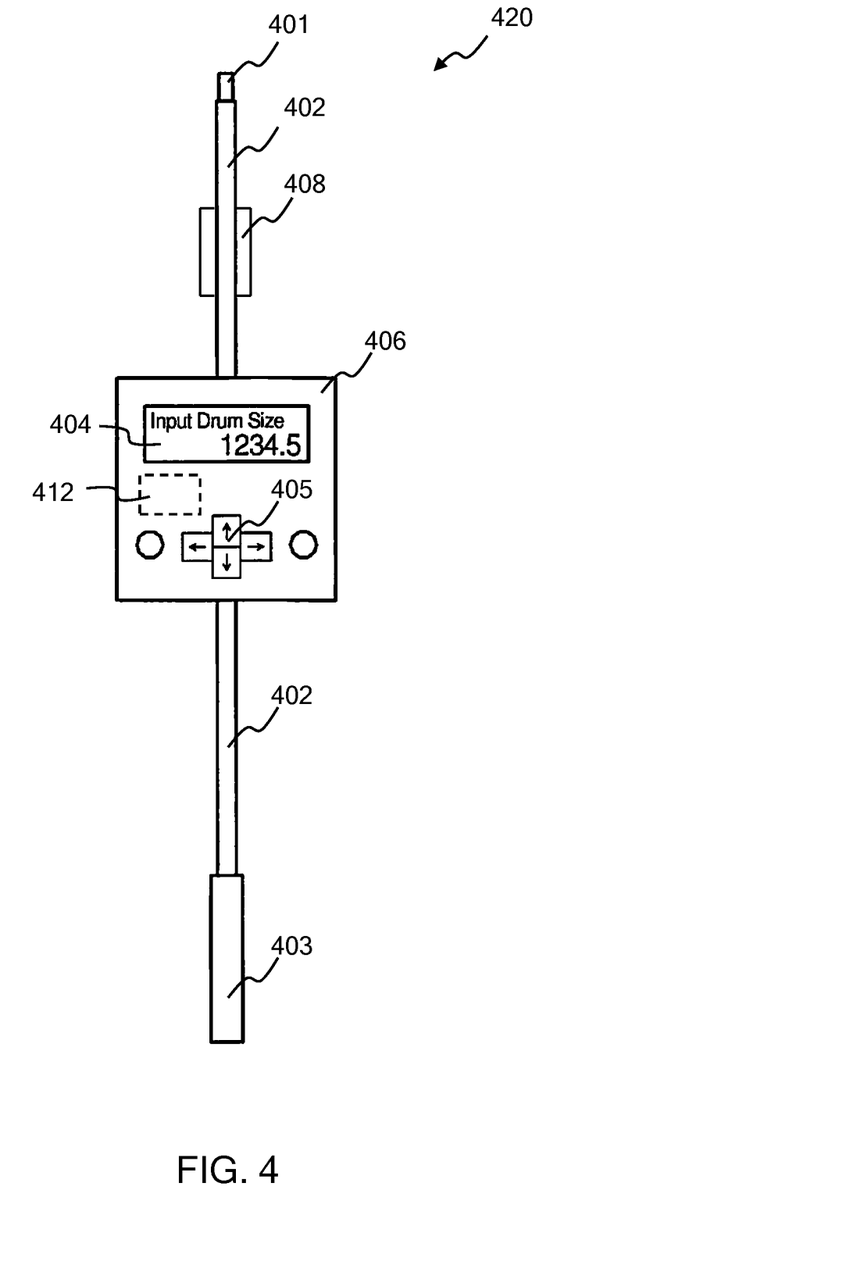
FIG. 4 is a top view of an inch pounds per turn computing device.
Figure 5:
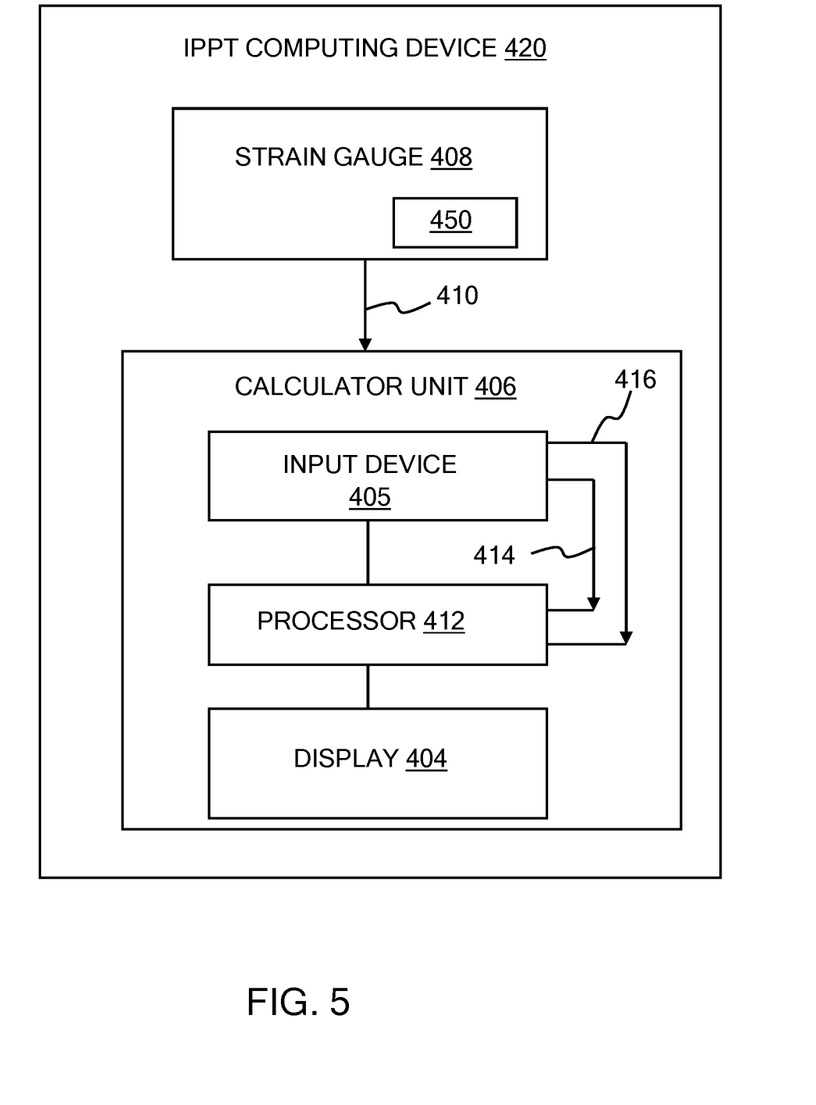
FIG. 5 is a block diagram of an IPPT computing device.

FIG. 4 and FIG. 5 shows an additional embodiment of an IPPT computing device 420, which can be used in place of IPPT computing device 301 to compute the IPPT required of garage door coil spring 310, 203, or 101 as described earlier. FIG. 4 shows a top view of IPPT computing device 420. FIG. 5 shows a block diagram of IPPT computing device 420. IPPT computing device 420 includes a shaft 402, a strain gauge 408 coupled to shaft 402, and a calculator unit 406 coupled to shaft 402 and communicatively coupled to strain gauge 408. Strain gauge 408 measures the strain on shaft 402. Shaft 402 is a calibrated strain or torque measuring shaft such as used on torque wrenches, for example. Strain gauge 408 sends a strain measurement to calculator unit 406, where the strain measurement is a measurement of the strain on shaft 402. Calculator unit 406 computes the IPPT required for garage door spring coil 101, 203, or 310 of FIG. 1A, FIG. 2, or FIG. 3, for example, in response to receiving a strain measurement from strain gauge 408. Shaft 402 of IPPT computing device 420 includes an insert end 401 and a handle end 403 opposing insert end 401. IPPT computing device 420 can be used in place of IPPT computing device 301 of FIG. 3. In order to obtain a IPPT value required of garage door spring coil 310 as shown in FIG. 3, insert end 401 is inserted into winding end cone 302 of torsion spring assembly 300 and then slightly lifted upwardly (or downwardly depending on spring orientation) in order to send a strain measurement 410 (FIG. 5) to calculator unit 406. Strain measurement 410 is a measure of a strain on shaft 402 needed to lift the door weight. The anchor end cone 303 of spring coil 310 is bolted to bracket 304, which in turn is anchored to the garage wall. Insert end 401 is configured to couple to winding end cone 302 such that IPPT computing device 420 can be used as a lever to raise the garage door using winding end cone 302, torsion bar 344, and lifting cable 340. Strain gauge 408 outputs strain measurement 410 to calculator unit 406 in response to the strain on shaft 402 caused by using IPPT computing device 420 to lift the garage door. Calculator unit 406 calculates the IPPT required of garage door spring coil 310 in response to receiving strain measurement 410 from strain gauge 408, and displays the IPPT required of garage door spring coil 310 on display 404. Calculator unit 406 includes input device 405, processor 412, and display 404, as shown in FIG. 5. Input device 405 and display 404 are coupled to processor 412. Processor 412 computes the IPPT required of garage door spring coil 310 in response to receiving strain measurement 410 from strain gauge 408.

Strain gauge 408 in this embodiment includes a display 450. In some embodiments, strain measurement 410 is displayed on display 450, and entered manually into calculator unit 406 using input device 405.

In some embodiments, a drum size 414 or a garage door height 416 are entered into calculator unit 406 using input device 405. In some embodiments, drum size 414 or garage door height 416 are used to compute the IPPT required. In some embodiments, the drum size and garage door height are stored in a memory in calculator unit 406 and do not need to be manually entered. In some embodiments, other values or variables used in the IPPT calculation are entered using input device 405. In some embodiments, some or all of these values are entered into calculator unit 406 using input device 405:

I. garage door height *
II. Drum size*
III. Track radius *
IV. Track pitch (if applicable)
V. spring
  1. Life, i.e. number of cycles
  2. ID
  3. Wire type
    a. Flat
      i. Thickness
    b. Round
      i. Diameter
  4. Wire grade—
    a. Oil Tempered MB—O.H. Door Grade
    b. Oil Tempered MB—Class I
    c. Oil Tempered MB—Class II
VI. Type of lift
  1. Standard
  2. High
  3. Vertical
* minimum needed The sequence used to obtain strain measurement 410 is as follows:

1. Operate manual release from the garage door opener motor such as motor 236 of FIG. 2. This disconnects the garage door from the garage door opener. The door can then be raised/lowered manually.

2. Clamp torsion bar, such as torsion bar 204 or 344 for example, with a tool against a door frame or other stationary brace such as a wall. This is done by using a vice grip tool and bracing the handle against the garage wall. The wires from the torsion bar are then kept in tension to the torsion bar by the door weight.

3. Unwind all spring coils so that they provide no significant torsion moment on the torsion bar.

4. Lock the winding end cone, such as winding end cone 302 of FIG. 3, of one spring coil, such as spring coil 310, on the torsion bar, such as torsion bar 344 of FIG. 3. This is done by tightening the bolts of winding end cone 302 onto torsion bar 344.

5. Input drum size 414, door height 416, and any other variables desired or needed into input device 405.

6. Insert IPPT computing device 420, for example, into winding end cone 302 as shown in FIG. 3, and use IPPT computing device 420 as a lever to raise the garage door a small amount, such as an inch or two.

7. If needed, enter strain measurement 410 into calculator unit 406 if this is not automatically done.

8. Read the IPPT required of garage door spring coil 310, for example, from display 404. IPPT computing device 420 will use strain measurement 410, together with drum size 414, door height 416, and any other entered variables, to compute the IPPT required of garage door spring coil 310 and display the IPPT required on display 404.

Figure 6:
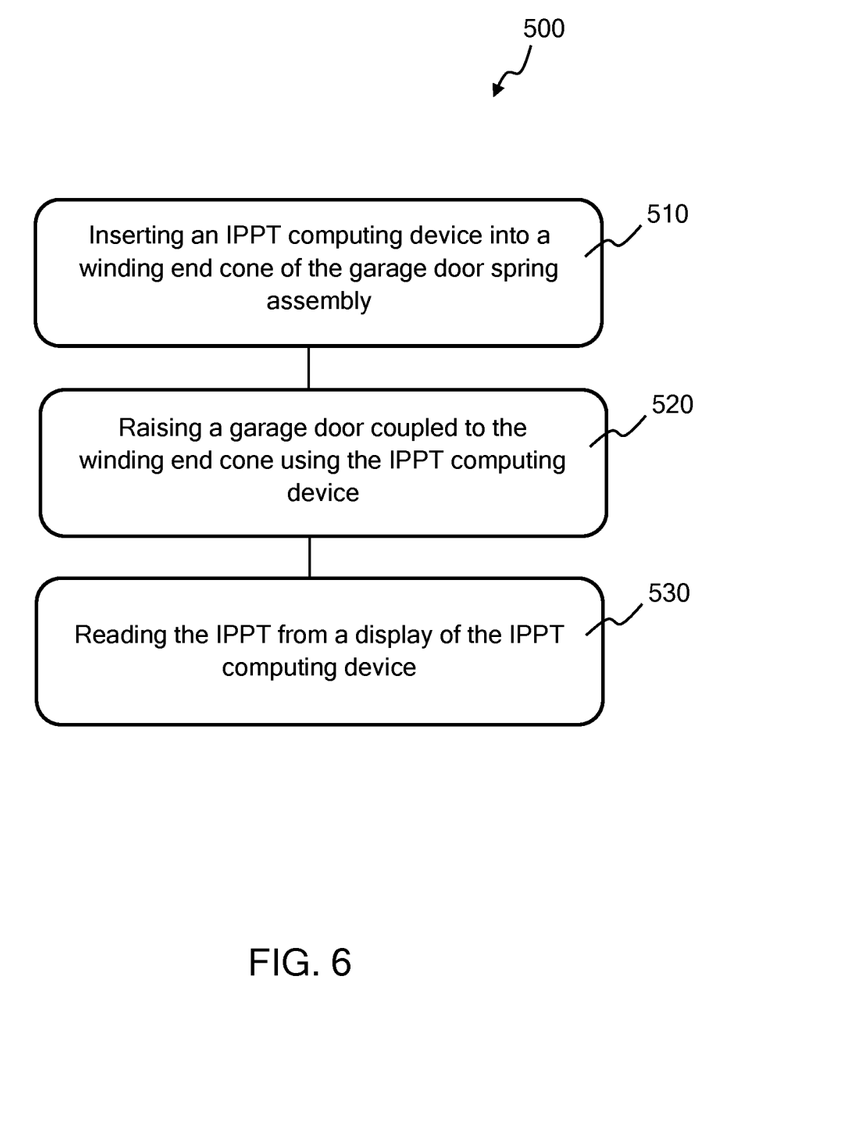
FIG. 6 shows a method of determining the IPPT required of a garage door torsion spring assembly.

FIG. 6 illustrates a method 500 of determining the inch pounds per turn (IPPT) for a garage door torsion spring assembly of a garage door opening system. Method 500 includes an act 510 of inserting an inch pounds per turn (IPPT) computing device into a winding end cone of the garage door torsion spring assembly. Method 500 includes an act 520 of raising a garage door coupled to the winding end cone using the IPPT computing device. And method 500 includes an act 530 of reading the IPPT from a display of the IPPT computing device. Method 500 can include many other acts. In some embodiments, method 500 includes disconnecting a garage door from the garage door opening system. In some embodiments, method 500 includes unwinding a garage door spring coil of the garage door torsion spring assembly. In some embodiments, method 500 includes coupling the winding end cone of the garage door torsion spring assembly to a torsion bar of the garage door opening system. In some embodiments, method 500 includes restraining movement of the torsion bar of the garage door opening system before unwinding the garage door spring coil of the garage door torsion spring assembly.

In some embodiments, method 500 includes inputting a drum size into an input device of the IPPT computing device before inserting the inch pounds per turn (IPPT) computing device into the winding end cone of the garage door torsion spring assembly. In some embodiments, method 500 includes inputting a garage door height into an input device of the IPPT computing device before inserting the inch pounds per turn (IPPT) computing device into the winding end cone of the garage door torsion spring assembly. In some embodiments, method 500 includes entering a strain gauge measurement output from a strain gauge of the IPPT computing device into an input device of the IPPT computing device before reading the IPPT from the display of the IPPT computing device.

In some embodiments, act 520 of raising the garage door coupled to the winding end cone using the IPPT computing device comprises using the IPPT computing device as a lever to raise the garage door using a torsion bar and a drum.

In some embodiments, act 520 of raising a garage door coupled to the winding end cone using the IPPT computing device comprises raising the garage door at least one inch.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. An inch pound per turn (IPPT) computing device for a garage door spring coil, the IPPT computing device comprising:
    a shaft comprising an insert end and a handle end opposing the insert end, wherein the insert end couples to a winding end cone coupled to the garage door spring coil;
    a strain gauge coupled to the shaft; and
    a calculator unit mechanically coupled to the shaft and communicatively coupled to the strain gauge;
    wherein the calculator unit computes an inch pounds per turn (IPPT) value required for the garage door spring coil in response to receiving a strain measurement from the strain gauge and a garage door height.

2. The IPPT computing device of claim 1, wherein the strain gauge outputs the strain measurement in response to measuring a strain on the shaft.

3. The IPPT computing device of claim 1, wherein the calculator unit comprises a processor and an input device coupled to the processor.

4. The IPPT computing device of claim 3, wherein the processor computes the inch pounds per turn required for the garage door spring coil using the strain measurement and a drum size.

5. A method of determining the inch pounds per turn (IPPT) for a garage door torsion spring assembly of a garage door opening system, the method comprising:
    inputting a drum size and a garage door height into an input device of an IPPT computing device;
    inserting the inch pounds per turn (IPPT) computing device into a winding end cone of the garage door torsion spring assembly;
    raising a garage door coupled to the winding end cone using the IPPT computing device as a lever; and
    reading the IPPT from a display of the IPPT computing device.

6. The method of claim 5, further comprising:
    disconnecting a garage door from the garage door opening system; and
    unwinding a garage door spring coil of the garage door torsion spring assembly.

7. The method of claim 6, further comprising coupling the winding end cone of the garage door torsion spring assembly to a torsion bar of the garage door opening system.

8. The method of claim 7, further comprising restraining movement of the torsion bar of the garage door opening system before unwinding the garage door spring coil of the garage door torsion spring assembly.

9. The method of claim 5, further comprising entering a strain gauge measurement output from a strain gauge of the IPPT computing device into an input device of the IPPT computing device before reading the IPPT from the display of the IPPT computing device.

10. The method of claim 5, wherein the raising the garage door coupled to the winding end cone using the IPPT computing device as a lever comprises using the IPPT computing device as a lever to raise the garage door using a torsion bar and a drum.

11. The method of claim 5, wherein the raising the garage door coupled to the winding end cone using the IPPT computing device as a lever comprises raising the garage door at least one inch.

12. A system for computing the inch pounds per turn (IPPT) required of a garage door spring coil, the system comprising:
- a garage door torsion spring assembly coupled to a garage door, wherein the garage door torsion spring assembly comprises a winding end cone coupled to a winding end of the garage door spring coil; and
- an inch pound per turn (IPPT) computing device comprising:
  - an insert end, wherein the insert end removably couples to the winding end cone of the garage door spring assembly;
  - a strain gauge; and
  - a processor, wherein the processor computes the IPPT required of the garage door spring coil in response to receiving a strain measurement from the strain gauge and the IPPT computing device being used to raise the garage door using the winding end cone.

13. The system of claim 12, wherein the winding end cone of the garage door torsion spring assembly is coupled to the garage door through a torsion shaft.

14. The system of claim 12, wherein the strain gauge sends the strain measurement to the processor.

* * * * *